United States Patent [19]
Graham et al.

[11] 3,753,411
[45] Aug. 21, 1973

[54] REGULATOR FOR CAM CONTROLLED FEED IN SEWING MACHINE

[75] Inventors: Richard P. Graham, Westfield; Henry Schaeflern, Somerville, Bridgewater Twsp., both of N.J.

[73] Assignee: The Singer Company, New York, N.Y.

[22] Filed: June 30, 1972

[21] Appl. No.: 267,773

[52] U.S. Cl............................. 112/210, 112/158 A
[51] Int. Cl............................................. D05b 3/04
[58] Field of Search................... 112/158 R, 158 A, 112/158 B, 158 C, 210

[56] References Cited
UNITED STATES PATENTS

| | | | |
|---|---|---|---|
| 3,043,253 | 7/1962 | Wank et al. | 112/210 X |
| 3,091,200 | 5/1963 | Fukunaga | 112/158 A |
| 3,177,835 | 4/1965 | Tanaka et al. | 112/158 A |

*Primary Examiner*—Werner H. Schroeder
*Attorney*—Marshall J. Breen et al.

[57] ABSTRACT

A control mechanism for selectively rendering effective a manual or a cam control for the sewing machine work feeding mechanism. Simultaneously with selection of cam control for the work feeding mechanism, provision is made for rendering ineffective the heavy spring which biases the work feeding mechanism in a forward direction of feed during manual control. Also associated with the selector for manual or cam control of the work feeding mechanism is a cam follower throw-out device whereby exchange of pattern cams is facilitated.

7 Claims, 6 Drawing Figures

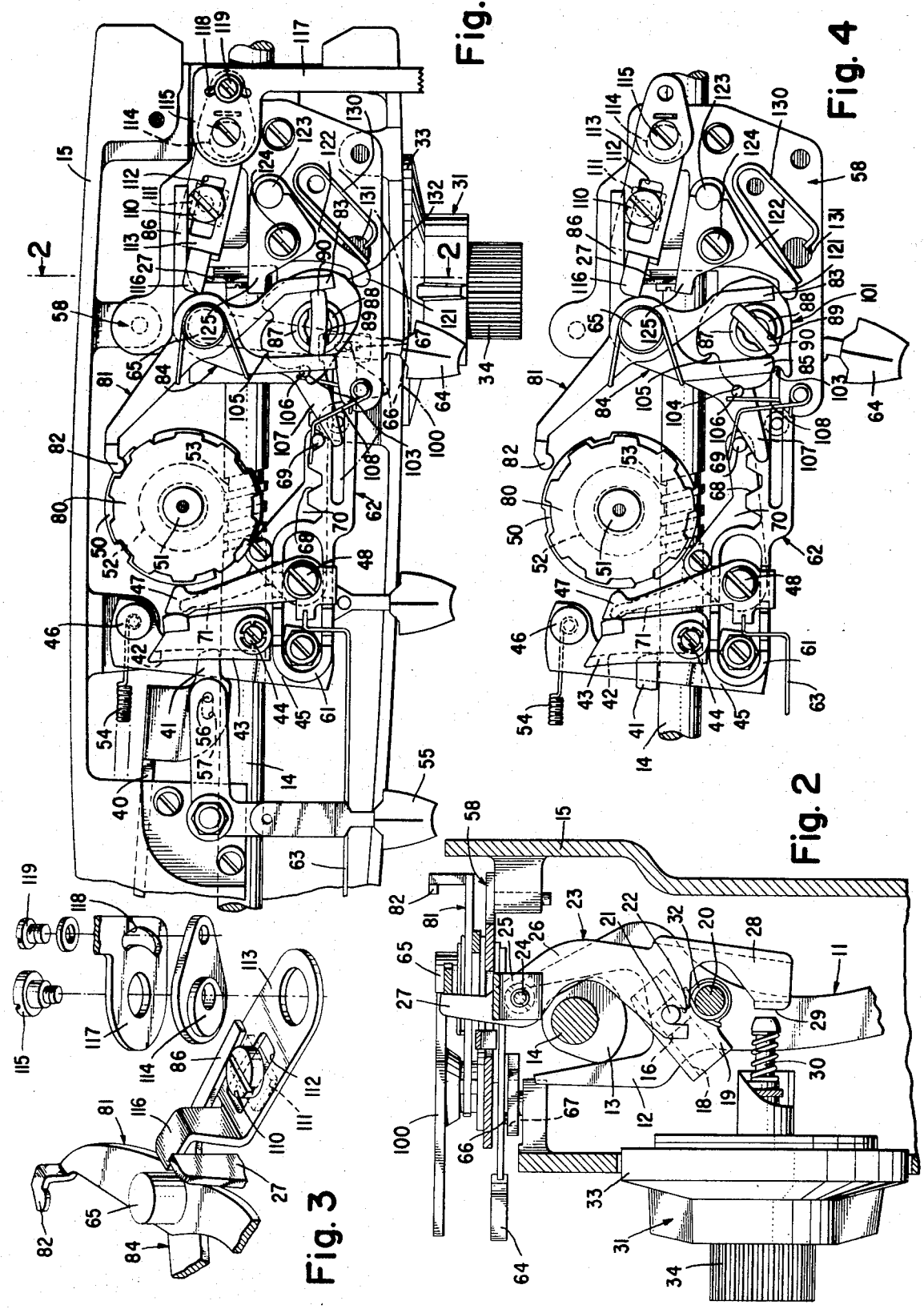

3,753,411

REGULATOR FOR CAM CONTROLLED FEED IN SEWING MACHINE

BACKGROUND OF THE INVENTION

It is known to provide a manual stitch length regulator with a special position for rendering effective a pattern cam control for the work feeding mechanism of a sewing machine. Although with these known devices, one regulator serves two purposes which seems to provide a certain economy of control instrumentalities on a sewing machine, these known devices require the provision of additional control instrumentalities for related functions, such as for withdrawing cam followers for cam exchange or the like, and therefore, they do not economize on the total number of control instrumentalities required on most sewing machines. These known devices, moreover, do not make it possible to combine the effect of manual and pattern cam feed control; and none includes any regulation for the spring pressure by which the sewing machine work feeding mechanism is biased.

SUMMARY OF THE INVENTION

It is an object of this invention to provide in a sewing machine having a manual stitch length regulator and a pattern cam for automatically regulating the stitch length, an operator influenced control for rendering the pattern cam effective, for simultaneously influencing the spring force by which the work feeding mechanism is biased to an appropriate value and for shifting all cam followers out of cam tracking position when it is desired to exchange pattern cams.

This object is attained by the provision of a manually influenced carrier by which an interposer can be shifted into an effective position coupling a pattern cam follower with the stitch regulator of the sewing machine. Control cams are also associated with the manually influenced carrier to regulate the work feed mechanism spring and a pattern cam follower throw-out mechanism simultaneously with shifting of the interposer into and out of effective position.

DESCRIPTION OF THE DRAWINGS

In the accompanying drawings of a preferred embodiment:

FIG. 1 represents a top plan view of a portion of a sewing machine bracket arm with the top cover removed to illustrate a pattern cam control means for both the zigzag needle vibration and stitch length, showing the mechanism of this invention in a position rendering the pattern cam control for the stitch length effective, FIG. 2 is a cross-sectional view taken substantially along line 2—2 of FIG. 1, FIG. 3 is an enlarged perspective view of fragments of the linkage by which the pattern cam follower is connected to the stitch length regulator, FIG. 4 is a top plan view similar to FIG. 1, but showing the control mechanism of this invention in a position readying the sewing machine for exchange of pattern cam units.

This invention may be used with any sewing machine having a work feeding mechanism of which the stitch length may be regulated. Any conventional drop feed mechanism may be used and, therefore, a complete sewing machine work feeding mechanism is not shown in the accompanying drawings. In order that this invention may be understood, FIG. 2 illustrates a fragment of a sewing machine work feeding mechanism including the work feed advance drive pitman 11 formed with a bifurcated head 12 embracing a constant breadth cam 13 fast on a sewing machine main shaft 14 journaled in the bracket arm 15 of a sewing machine frame. The pitman 11 has a slide block 16 pivoted thereon, and the slide block is constrained in a guide slot 18 of a feed regulating block 19 pivoted on a pin 20 in the bracket arm 15. The angular position of the feed regulating block 19 determines the stitch length and direction of work feed of a conventional drop feed mechanism for a sewing machine.

A pin 21 protruding from the feed regulating block is embraced by a slot 22 formed in a sheet metal extension piece 23 fulcrummed on a pin 24 carried by a support 25 extending from the bracket arm 15. The extension piece 23 is formed with an upturned arm 26 terminating in an operating finger 27 by way of which pattern cam control influence may be exerted on the feed mechanism as will be described hereinbelow. The extension piece 23 also has a downturned arm 28 terminating in a tab 29 against which can engage a plunger 30 of a manual feed regulating device, indicated generally at 31. Any suitable manual feed regulator may be used, since its specific construction does not form a part of this invention. As illustrated in FIG. 2, a light coil spring 32 biases the feed regulating block 19 in a counterclockwise direction toward the maximum forward stitch length position urging the tab 29 toward the plunger 30. A dial 33 regulates the position of the plunger and an axially shiftable push button 34 is provided for rapidly shifting the plunger to the right, as viewed in FIG. 2, to provide a quick feed reverse.

Figure 5:
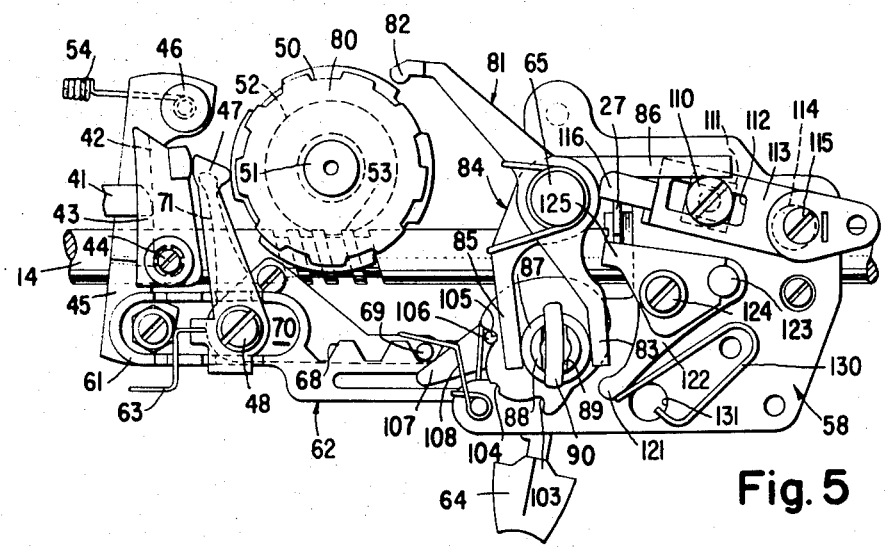
FIG. 5 is a top plan view similar to FIG. 1, showing the control mechanism of this invention in a position readying the machine for sewing operations with manual regulation of stitch length.
Figure 6:
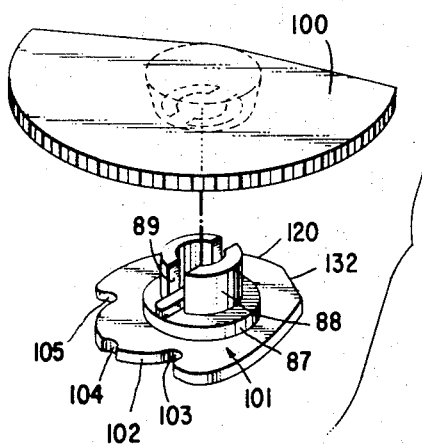
FIG. 6 is a perspective view of the control dial and control mechanism of this invention.

This invention will find use preferably with a sewing machine having a zigzag stitch mechanism capable of operation under control of a pattern cam. Any such known zigzag mechanism may be employed and, therefore, the sewing machine needle mechanism is not illustrated in the accompanying drawings.

The drawings illustrate a portion of connecting link 40 adapted to transmit to the needle bar gate of any of the known varieties of zigzag sewing machine jogging movements in response to pattern information. The connecting link terminates in a finger 41 which abuts a radial track 42 formed in a lever 43 fulcrummed on a pin 44 in a position regulating frame 45 pivoted on a fixed pin 46 in the bracket arm 15 of the machine frame.

A needle jogging cam follower 47 pivoted on a stud shaft 48 in the bracket arm 15 of the sewing machine is arranged between the lever 43 and a pattern cam 50 fast on a camshaft 51 in the machine frame bracket arm 15. The pattern cam 50 may be one of a stack of cams permanently mounted on the camshaft which also carries a worm wheel 52 in mesh with a worm 53 on the main shaft 14. A spring 54 anchored on the machine frame is attached to the connecting link 40 and serves to bias the finger 41 against the track 42. The spring 54 thus indirectly biases the cam follower 47 into tracking relation with the pattern cam 50. By means of a bell crank bight regulator 55 which carries a pin 56 arranged in a slot 57 in the connecting link 40, the finger 41 may be shifted at will along the track 42 to regulate the width of zigzag stitching produced by the sewing machine.

The needle jogging cam follower 47 is axially shiftable along the stud shaft 48 and overlies a stepped follower raising surface 61 of a selector member 62. A light leaf spring 63 secured on the bracket arm 15 engages and biases the needle jogging cam follower 47 downwardly against the selector member and also biases the cam follower away from the pattern cam 50. A control lever 64 is fulcrummed on a pivot stud 65 secured in a mounting plate 58 which is accurately attached to the bracket arm 15. As disclosed in greater detail in the U.S. patent application No. 171,935 of Urciola and Marsh filed Aug. 16, 1971 now U.S. Pat. No. 3,699,910, Oct. 24, 1972 to which reference may be had, the control lever 64 carries a pin 66 which engages a slot 67 in the selector member so that a selected one of the stepped follower raising surfaces 61 may be positioned beneath the cam follower 47 to locate the follower in tracking relation with any one of the cams 50 in the stack.

The selector member 62 is also formed with a follower disengaging cam surface 68 which cooperates with a pin 69 carried on a lever 70 pivoted on the stud shaft 48. Associated with the lever 70 is a throw-out lever arm 71 which abuts the lever 43 and can shift the lever 43 away from the pattern cam 50 to allow the cam follower 47 to move out of cam tracking relation with response to the bias of the light leaf spring 63.

On the pattern camshaft 51 is also located a work feed controlling pattern cam 80 which may be exchangeable on the cam-shaft and which also may be associated with a zigzag pattern cam 50 so that the two are exchangeable as a unit and when used together produce a predetermined pattern and ornamental stitching. A work feed cam follower lever 81 pivotally supported on the pivot stud 65 includes a cam tracking finger 82 at one side of the pivot stud and a tail portion 83 at the opposite side thereof. Also fulcrummed on the pivot stud 65 is a transmission lever 84 which includes a lever arm 85 arranged substantially parallel to the tail portion 83 of the cam follower lever and a second lever arm 86. Between the lever arm 85 and the tail portion 83 extends a bushing 87 in which is journalled a control shaft 88 which is transversely slotted as at 89 loosely to accommodate an interposer element 90 which is thus freely movable diametrically across the control shaft in the slot 89.

Above the transverse slot 89, the control shaft carries an operating dial 100, while below the transverse slot the control shaft has fast thereon a cam disc 101. One portion of the cam disc periphery is formed with a cam surface 102 including three spaced locating notches 103, 104 and 105 determining three different positions for the operating dial is shown in FIGS. 1, 4 and 5.

A pin 106 carried on a throw-out lever 107 fulcrummed on the pivot stud 65 tracks the cam surface 102. When the control shaft 88 is turned into the position shown in FIG. 4, with the pin 106 located in the notch 104, the throw-out lever will engage and shift the pin 69 of the lever 70 to remove the lever 43 away from the pattern cam 50 thus permitting the light leaf spring 63 to shift the needle jogging cam follower 47 out of cam tracking relation.

When the pin 106 occupies a position in the other locating notches 103 or 105, the throw-out lever 107 will not be effective but the end positions of turning movement of the control shaft 88 will be determined. A light coil spring 108 biases the pin 106 against the cam surface 102 and also biases the pin 69 toward the follower disengaging surface 68 of the selector member 62.

With the control shaft 88 turned into the position shown in FIG. 1 with the pin 106 in the locating notch 103, the interposer element 90 will be brought into position movable transversely to each of the lever arms 85 and 83 so as to interconnect the follower lever 81 and the transmission lever 84 for movement in unison.

The second lever arm 86 of the transmission lever 84 engages a headed clamp screw 110 threaded into a clamp block 111 so that the clamp screw may be selectively positioned along a slot 112 in a lever 113 fulcrummed on an accentric bushing 114 which is pivoted on a shoulder screw 115 threaded in the sewing machine bracket arm 15. The free extremity 116 of th lever 113 abuts the upstanding finger 27 of the extension piece 23 which controls the angular position of the feed regulating block 19. The clamp screw 110 provides for a general adjustment of the proportion of movement of the cam follower lever 81 with respect to the movement of the feed regulating block. This adjustment would ordinarily be made when the machine is first assembled and would not require any change thereafter. The eccentric bushing 114 may be adjusted by the sewing machine user to provide for a balance regulation, that is, for accurately aligning the free regulator block 19 in position to produce zero stitching length when a portion of the feed pattern cam 80 which dictates zero stitch length is being tracked by the feed cam tracking finger 82.

For assisting the operator in adjusting the eccentric bushing 114, an adjusting lever 117 is also fulcrummed on the shoulder screw 115 and extends to a position for access by the machine operator. An arcuate slot 118 in the adjusting lever 116 accommodates a clamp screw 119 threaded into the eccentric bushing.

The cam disc 101 operated by the control shaft 88 is formed with an additional cam surface 120 which is tracked by a finger 121 formed on a follower lever 122 having its fulcrum on a pivot pin 123 secured in the mounting plate 58 on the sewing machine frame. Adjustably clamped to the follower lever 122 by a clamp screw 124 is a lever arm 125 arranged in engagement with the upstanding finger 27 of the extension piece 25 which controls the angular position of the feed regulating block 19. A heavy leaf spring 130 hooked at one extremity into an aperture 131 in the mounting plate 58 engages the follower lever 122 biasing the follower finger 121 against the cam surface 120 and when permitted by the cam surface 120 biasing the lever arm 125 against the finger 27.

As shown in FIG. 1, when the feed controlling pattern cam 80 is effective, the heavy spring 130 will be forced out of action and the follower finger 121 will contact a flat section 132 of the cam surface 120 so that the heavy spring will not impart any turning movement to the control member 88. In both other positions of the control shaft 88, as shown in FIGS. 4 and 5, the heavy spring 130 will be effective to bias the feed regulating mechanism. The heavy spring 130 which is a desirable and necessary complement to manual feed regulation, is thus held in an ineffective position whenever pattern cam control of the work feed is effected by the control mechanism of this invention.

What is claimed is:

1. A sewing machine having stitch forming instrumentalities, actuating mechanism therefor, a work feeding mechanism including a stitch length regulator with a manual setting device, a pattern cam means driven by said actuating mechanism, a cam follower adapted to track said pattern cam means, and an operating linkage operatively connected to said stitch length regulator, said cam follower and said operating linkage each including a lever, said levers pivoted on a substantially common fulcrum axis, and including adjacent radially extending lever arms, means for selectively rendering said cam follower effective to control said stitch length regulator comprising an operator influenced carrier member, an interposer constrained to move along a predetermined path on said carrier member, means shiftably supporting said carrier member on said sewing machine selectively to arrange said interposer in an effective position interlocking said lever arms for turning movement in unison and effective for transmitting motion from said cam follower to said operating linkage for the stitch length regulator.

2. A sewing machine as set forth in claim 1 in which said carrier member comprises a shaft which is arranged between said lever arms on axis substantially parallel to said fulcrum axis and formed diametrically with a guide slot, in which said interposer comprises a slide block shiftable in said guide slot and in which the interposer in said effective position engages each of said lever arms substantially equidistant from said fulcrum axis.

3. A sewing machine as set forth in claim 1 including a heavy spring biasing said stitch length regulator toward one extreme position in opposition to said manual setting device and in which a throw-out actuator for said heavy spring is arranged on said operator influenced carrier member to remove the heavy spring bias from said stitch length regulator when said interposer occupies an effective position for transmitting motion from the cam follower to the stitch length regulator.

4. A sewing machine as set forth in claim 1 in which cam follower throw-out means is provided effective to remove said cam follower out of tracking relation with said pattern cam means when said interposer occupies positions ineffective to transmit motion from said cam follower to said stitch length regulator.

5. A sewing machine as set forth in claim 4 in which an additional cam follower adapted to track said pattern cam means jogs said stitch forming instrumentalities, and in which a throwout actuator for said additional cam follower is arranged on said operator influenced carrier member and is effective to remove said additional cam follower out of tracking relation with said pattern cam means when said interposer occupies a position ineffective to transmit motion from said cam follower to said stitch length regulator.

6. A sewing machine as set forth in claim 2 including a heavy spring biasing said stitch length regulator toward one extreme position in opposition to said manual setting device, and an additional cam follower for jogging said stitch forming instrumentalities adapted to track said pattern cam means, in which said carrier member shaft carries a control cam fast thereon operative when said interposer is shifted into effective position to remove said heavy spring bias from said stitch length regulator and operative when said interposer is shifted out of effective position to remove said additional cam follower out of tracking relation with said pattern cam means.

7. A sewing machine as set forth in claim 6 in which said carrier member shaft can be turned manually in opposite directions from a mid-portion in which said interposer occupies an effective position for transmitting motion from said pattern cam means to said stitch length regulator, in which said control cam is formed to ready the sewing machine for patterned zigzag sewing with manual stitch length regulation when the carrier member is turned in one direction from said mid-position by restoring said heavy feed regulator biasing spring, and in which said control cam is formed to ready the pattern cam means for exchange of cam units by removing said additional cam follower out of tracking relation with said pattern cam means when the carrier member shaft is turned in the opposite direction.

* * * * *